US012632379B2

(12) United States Patent
Choe et al.

(10) Patent No.: US 12,632,379 B2
(45) Date of Patent: May 19, 2026

(54) STORAGE DEVICE, OPERATING METHOD OF STORAGE DEVICE, AND STORAGE SYSTEM WHERE FAILURE SIGNAL IS GENERATED BASED ON LOGICAL ADDRESS MISMATCH

(71) Applicant: Samsung Electronics Co., Ltd., Suwon-si (KR)

(72) Inventors: Gyuseok Choe, Suwon-si (KR); Myungsub Shin, Suwon-si (KR); Seongheum Baik, Suwon-si (KR); Kyung Phil Yoo, Suwon-si (KR); Seongyong Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/884,571

(22) Filed: Sep. 13, 2024

(65) Prior Publication Data

US 2025/0252045 A1     Aug. 7, 2025

(30) Foreign Application Priority Data

Feb. 7, 2024   (KR) ........................ 10-2024-0019064

(51) Int. Cl.
*G06F 12/02* (2006.01)
(52) U.S. Cl.
CPC .. *G06F 12/0246* (2013.01); *G06F 2212/7202* (2013.01); *G06F 2212/7203* (2013.01)
(58) Field of Classification Search
CPC ......... G06F 12/0246; G06F 2212/7202; G06F 2212/7203
See application file for complete search history.

(56) References Cited

U.S. PATENT DOCUMENTS

| | | |
|---|---|---|
| 11,372,543 B2 | 6/2022 | Benisty et al. |
| 11,487,627 B2 | 11/2022 | Shin et al. |
| 11,513,726 B2 | 11/2022 | Jang |
| 11,687,262 B2 | 6/2023 | Kwak et al. |

(Continued)

FOREIGN PATENT DOCUMENTS

| | | |
|---|---|---|
| CN | 103186470 B | 4/2016 |
| CN | 114924923 A | 8/2022 |

OTHER PUBLICATIONS

Extended European Search Report in European Appln. No. 24212175.4, mailed on May 20, 2025, 11 pages.

*Primary Examiner* — Chie Yew

(74) *Attorney, Agent, or Firm* — Fish & Richardson P.C.

(57) ABSTRACT

A storage device according to some example embodiments comprises a non-volatile memory including a first memory including a plurality of zones configured to sequentially store data based on a write pointer, the write pointer indicating a position to write the data, and a second memory configured to store preliminary data to be written in the plurality of zones, and a storage controller configured to receive a plurality of operation requests, each of the plurality of operation requests including a logical block address, a write command, and write data, and store first write data corresponding to a first operation request in the second memory as first preliminary data, if the position of a first logical block address corresponding to the first operation request among the plurality of operation requests and the write pointer does not match.

19 Claims, 11 Drawing Sheets

(56)         References Cited

U.S. PATENT DOCUMENTS

| | | | |
|---|---|---|---|
| 2021/0089447 A1* | 3/2021 | Jin | G06F 1/263 |
| 2021/0182152 A1 | 6/2021 | Shin et al. | |
| 2021/0318801 A1 | 10/2021 | Benisty et al. | |
| 2021/0318820 A1* | 10/2021 | Jin | G06F 3/0673 |
| 2021/0334006 A1* | 10/2021 | Singh | G06F 3/0679 |
| 2021/0397509 A1* | 12/2021 | Lin | G06F 11/073 |
| 2022/0066692 A1* | 3/2022 | Noh | G06F 3/0604 |
| 2022/0100419 A1 | 3/2022 | Jang | |
| 2022/0137817 A1 | 5/2022 | Kwak et al. | |
| 2022/0179794 A1 | 6/2022 | Kanteti et al. | |
| 2023/0161500 A1 | 5/2023 | Doucette et al. | |
| 2023/0244398 A1 | 8/2023 | Kanteti | |
| 2024/0143509 A1* | 5/2024 | Sela | G06F 3/0644 |

* cited by examiner

STORAGE DEVICE, OPERATING METHOD OF STORAGE DEVICE, AND STORAGE SYSTEM WHERE FAILURE SIGNAL IS GENERATED BASED ON LOGICAL ADDRESS MISMATCH

CROSS-REFERENCE TO RELATED APPLICATION

This application claims priority under 35 U.S.C. § 119 to, and the benefit of, Korean Patent Application No. 10-2024-0019064 filed on Feb. 7, 2024, in the Korean Intellectual Property Office, the entire contents of which are incorporated herein by reference.

BACKGROUND

The present inventive concepts relate to storage devices, operating methods of storage devices, and storage systems.

As a non-volatile memory, a flash memory may retain the data even in the absence of applied power. Recently, storage devices including flash memory, such as solid state drives (SSD) and memory cards, are being widely used.

In general, a non-volatile memory may store data depending on a random access. Meanwhile, the random access accompanies a frequent garbage collection (GC) operation for an entire region, thereby causing a decrease in the lifespan of a storage device. As a large over provisioning (OP) region is allocated for frequent garbage collection, wear leveling, and bad block management, an available storage capacity of the storage device may be decreased. To prevent the above issue, recently, there may be a technique for dividing memory blocks of the non-volatile memory device into zones and sequentially storing related data within a zone.

SUMMARY

The present inventive concepts provide storage devices capable of sequentially writing data to a non-volatile memory.

A storage device according to some example embodiments comprises a non-volatile memory including a first memory including a plurality of zones configured to sequentially store data based on a write pointer, the write pointer indicating a position to write the data, and a second memory configured to store preliminary data to be written in the plurality of zones; and a storage controller configured to receive a plurality of operation requests, each of the plurality of operation requests including a logical block address, a write command, and write data, and store first write data corresponding to a first operation request in the second memory as first preliminary data, if a position of a first logical block address corresponding to the first operation request among the plurality of operation requests and the write pointer does not match.

A storage system according to some example embodiments comprises a host device configured to send a plurality of operation requests, each of the plurality of operation requests including a logical block address, a write command, and write data; and a storage device including a first memory including a plurality of zones configured to sequentially store data, and a second memory configured to store preliminary data to be written in the plurality of zones, store first write data corresponding to a first operation request in the second memory as first preliminary data based on a determination that the first operation request among the plurality of operation requests cannot be processed, and write, in response to receiving a sync command from the host device, the first preliminary data to a position corresponding to a write pointer, the write pointer indicating a position in the first memory to write the data.

An operating method of a storage system according to some example embodiments comprises receiving an operation request for writing write data to a position corresponding to a first logical block address in a plurality of zones, the plurality of zones configured to sequentially store data using a write pointer indicating a position to write the data, determining a target zone to write among the plurality of zones and a target write pointer indicating a position to write in the target zone based on the first logical block address, and determining whether to process the operation request based on a position of a current write pointer of the target zone and a position of a target write pointer storing the write data as preliminary data in a second memory if the operation request cannot be processed, receiving a sync command including the first logical block address, and reading the preliminary data and writing the preliminary data to the position corresponding to the current write pointer of the target zone.

BRIEF DESCRIPTION OF THE DRAWINGS

FIG. 3 illustrates a partial configuration of a storage device according to some example embodiments.

DETAILED DESCRIPTION

Figure 1:
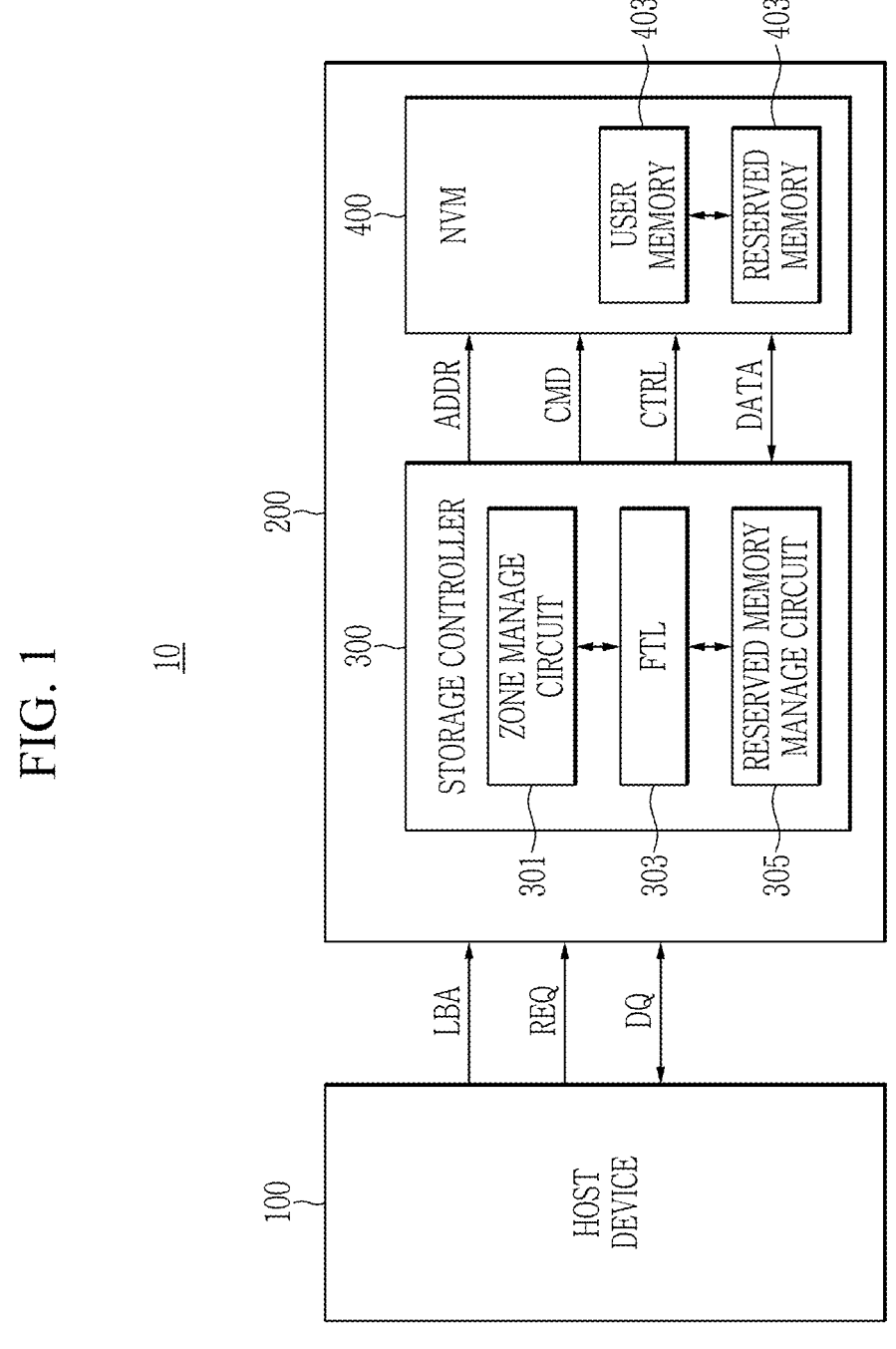
FIG. 1 illustrates a storage system according to some example embodiments.

In the following detailed description, only some example embodiments of the present inventive concepts have been shown and described, simply by way of illustration. As those skilled in the art would realize, the described example embodiments may be modified in various different ways, all without departing from the spirit or scope of the present inventive concepts.

Accordingly, the drawings and description are to be regarded as illustrative in nature and not restrictive. Like reference numerals designate like elements throughout the specification. In the flowchart described with reference to drawings in this description, the operation order may be changed, several operations may be merged, certain operations may be divided, and specific operations may not be performed.

In the description, expressions described in the singular in this specification may be interpreted as the singular or plural unless an explicit expression such as "one" or "single" is used. While terms including ordinal numbers, such as "first" and "second," etc., may be used to describe various components, such components are not limited to the above terms. These terms are only used to distinguish one constituent element from another constituent element.

Figure 2:
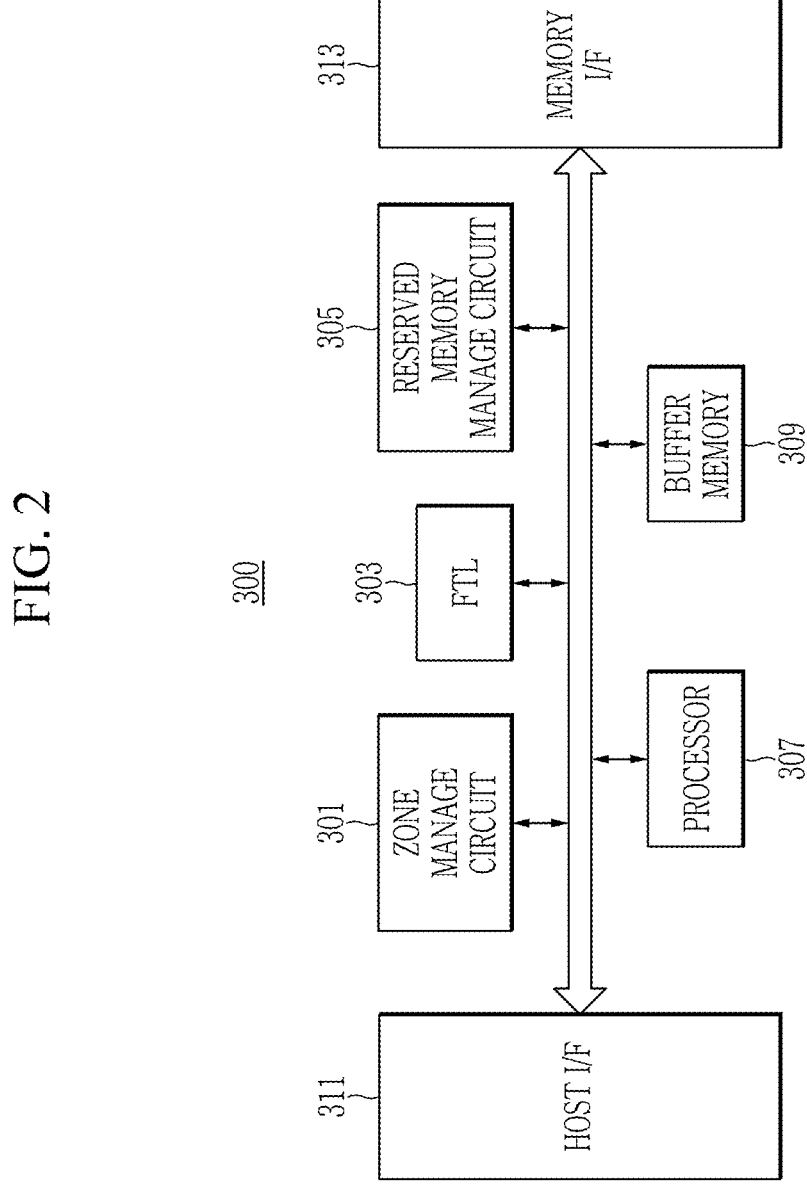
FIG. 2 illustrates a storage controller according to some example embodiments.
Figure 3:
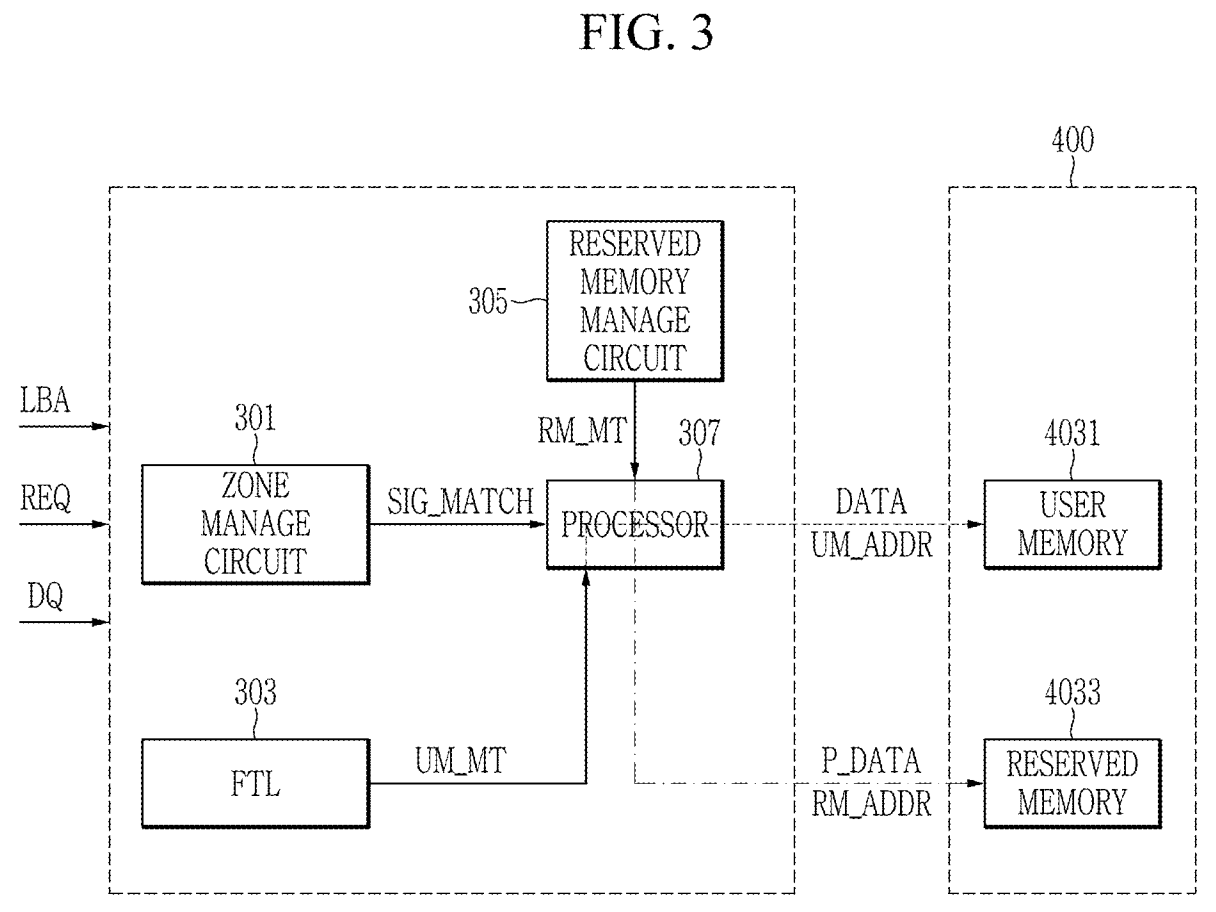

FIG. 1 illustrates a storage system according to some example embodiments. FIG. 2 illustrates a storage controller according to some example embodiments. FIG. 3 illustrates a partial configuration of a storage device according to some example embodiments.

In some example embodiments, a storage system 10 may be included in user devices such as personal computers, laptop computers, servers, media players, digital cameras, or the like, but example embodiments are not limited thereto. In some example embodiments, the storage system 10 may be included in automotive devices such as navigation devices, black boxes, automotive electronic devices, etc., but example embodiments are not limited thereto. In some example embodiments, the storage system 10 may be included in mobile systems such as mobile phones, smart phones, tablet personal computers (PC), wearable devices, healthcare devices or internet of things (IoT) devices, but example embodiments are not limited thereto.

As shown in FIG. 1, the storage system 10 includes a host device 100 and a storage device 200.

The host device 100 controls the overall operation of the storage system 10.

The host device 100 may communicate with the storage device 200 through various interfaces. For example, the host device 100 may communicate with the storage device 200 through various interfaces such as universal serial bus (USB), multi media card (MMC), PCI Express (PCI-E), AT Attachment (ATA), serial AT attachment (SATA), parallel AT attachment (PATA), small computer system (SCSI), serial attached SCSI (SAS), enhanced small disk interface (ESDI), integrated drive electronics (IDE), non-volatile memory express (NVMe), etc., but example embodiments are not limited thereto.

The host device 100 may provide, transmit, or send a logical block address LBA and a request signal REQ indicating a logical address to the storage device 200. In some example embodiments, the host device 100 may exchange data DQ with the storage device 200 (e.g., the host device 100 may transfer, transmit or send data DQ to the storage device 200 and may receive data DQ from the storage device 200.

In some example embodiments, the logical block address LBA may include a logical unit number LUN. The logical unit number may include information about the logical unit number of the storage device 200 to which the request signal REQ is transmitted or sent.

In some example embodiments, the request signal REQ may include a task tag, an initiator ID IID, a command set type, an expected data transmission length, etc., but example embodiments are not limited thereto. The task tag may include a unique tag value maintained for task-related transmission. The initiator ID may include information about the ID of the host device 100 transmitting or sending the request signal REQ. The expected data transmission length may include information about the number of bits transmitted or sent to complete a small computer system interface (SCSI) command request.

In some example embodiments, the host device 100 may transmit, provide, or send the request signal REQ including a write command, the logical block address LBA to which data DQ is to be written, and data DQ to the storage device 200. The storage device 200 may write data DQ to a position corresponding to the logical block address LBA in response to the request signal REQ and the logical block address LBA.

In some example embodiments, the host device 100 may transmit, provide, or send a plurality of operation requests to the storage device 200. For example, an operation request may include the request signal REQ and the logical block address LBA including a write command.

The storage device 200 may be accessed by the host device 100. For example, the storage device 200 may be implemented in the form of a solid state drive (SSD), a smart SSD, an embedded multimedia card (eMMC), an embedded universal flash storage (UFS) memory device, a UFS memory card, a compact flash (CF), secure digital (SD), micro secure digital (Micro-SD), mini secure digital (Mini-SD), extreme digital (xD), memory stick, or similar forms, but example embodiments are not limited thereto.

In some example embodiments, the storage device 200 may be connected to the host device 100 through a block accessible interface including a bus such as a serial advanced technology attachment (SATA) bus, a small computer small interface (SCSI) bus, a non-volatile memory express (NVMe) bus, a serial attached SCSI (SAS) bus, UFS, and eMMC, etc., but example embodiments are not limited thereto.

The storage device 200 may include a non-volatile memory 400 and a storage controller 300. The storage device 200 may store or process the data DQ in response to the request signal REQ from the host device 100.

The non-volatile memory 400 may include a plurality of dies or a plurality of chips including a memory cell array. For example, the non-volatile memory 400 may include a plurality of chips, and each of the plurality of chips may include a plurality of dies. In some example embodiments, the non-volatile memory 400 may also include a plurality of channels, each including a plurality of chips.

The non-volatile memory 400 may include NAND flash memory. In some example embodiments, the non-volatile memory 400 may include electrically erasable programmable read-only memory (EEPROM), phase change random access memory (PRAM), resistive RAM (ReRAM), resistance random access memory (RRAM), nano floating gate memory (NFGM), polymer random access memory (PoRAM), magnetic random access memory (MRAM), ferroelectric random access memory (FRAM), or similar memory, but example embodiments are not limited thereto. Hereinafter, in the following description, the non-volatile memory 400 will be described assuming that the non-volatile memory 400 is a NAND flash memory device.

In some example embodiments, the non-volatile memory 400 may include a user memory 4031 and a reserved memory 4033.

The user memory 4031 may be divided into a plurality of zones. The storage controller 300 may sequentially write data to the user memory 4031. Random writing may be prohibited within the user memory 4031. A write pointer may indicate a position where the next data will be written in each zone. In some example embodiments, when data is written to each zone, the corresponding write pointer may be updated.

In some example embodiments, the storage device 200 may be implemented based on various standards, such as zoned namespace (ZNS), zoned block device (ZBD), etc., but example embodiments are not limited thereto.

The reserved memory 4033 may store preliminary data. The preliminary data may be data to be written to the user memory 4031. For example, the storage controller 300 may read preliminary data stored in the reserved memory 4033 and write the read preliminary data into the user memory 4031.

In some example embodiments, the size of the reserved memory 4033 may be set in advance. For example, the storage device 200 may set the size of the reserved memory 4033 based on a set features command received from the host device 100.

In some example embodiments, such as in FIG. 1, one storage device 200 is shown as including one non-volatile memory 400, but the present inventive concepts are not limited thereto and the storage device 200 may include a plurality of non-volatile memories.

The storage controller 300 may control the operation of the storage device 200.

The storage controller 300 may provide an address ADDR, a command CMD, a control signal CTRL, etc., to the non-volatile memory 400 in response to the logical block address LBA and request signal REQ received from the host device 100.

In some example embodiments, the address ADDR may include a user memory address for the user memory 4031 and a reserved memory address for the reserved memory 4033. The storage controller 300 may provide, transmit, or send signals to the non-volatile memory 400 to write data to the non-volatile memory 400 or read data from the non-volatile memory 400. In some example embodiments, the storage controller 300 and the non-volatile memory 400 may exchange data DATA.

Referring to FIG. 2 together with FIG. 1, in some example embodiments the storage controller 300 may include a host interface 311, a zone manage circuit 301, a flash translation layer (FTL) 303, a reserved memory manage circuit 305, a processor 307, a buffer memory 309, and a memory interface 313.

The host interface 311 may transmit, provide, or send packets to the host device 100 and receive packets from the host device 100. A packet transmitted, provided, or sent from the host device 100 to the host interface 311 may include a command or data to be written to the non-volatile memory 400. A packet transmitted, provided, or sent from the host interface 311 to the host device 100 may include a response to a command or data read from the non-volatile memory 400.

The zone manage circuit 301 may manage the write pointer (WP) position of each of the plurality of zones in the user memory 4031. In some example embodiments, the zone manage circuit 301 may determine whether to process the request signal REQ based on the current status of a plurality of zones.

Referring to FIG. 3, in some example embodiments, the zone manage circuit 301 may generate a matching signal SIG_MATCH indicating whether or not the request signal REQ may be processed based on results of a write pointer comparison operation and the data size comparison operation. For example, the request signal REQ may include a write command. The zone manage circuit 301 may transmit, provide, or send the matching signal SIG_MATCH to the processor 307.

In some example embodiments, the zone manage circuit 301 may generate the matching signal SIG_MATCH indicating whether the positions of the write pointers match.

For example, the zone manage circuit 301 may derive, or alternatively determine, a zone address indicating a target zone to be written among a plurality of zones in the user memory 4031 and a position of the target write pointer to be written in the corresponding zone, based on the logical block address LBA received from the host device 100. The zone manage circuit 301 may perform a comparison operation of the write pointer. The zone manage circuit 301 may determine whether the position of the target write pointer and the position of the current write pointer of the target zone match. For example, the logical block address LBA may indicate a first zone among the plurality of zones of the user memory 4031 and a first position of the target write pointer of the first zone. The zone manage circuit 301 may compare the first position of the target write pointer and the second position of the current write pointer of the first zone.

In some example embodiments, the zone manage circuit 301 may generate the matching signal SIG_MATCH based on the results of a data size comparison operation.

For example, the zone manage circuit 301 may compare the size of the data DQ received from the host device 100 and the size of the remaining storage space of the target zone in the user memory 4031. For example, the first size of data DQ received from the host device 100 and the second size of the remaining storage space of the target zone may be compared. For example, the remaining storage space of the target zone may include at least one writable block.

For example, the zone manage circuit 301 may generate the matching signal SIG_MATCH indicating that writing is possible when the first position of the target write pointer matches the second position of the current write pointer of the target zone, and the first size of the data DQ is smaller than or equal to the second size, the remaining storage space in the target zone. For example, the zone manage circuit 301 may generate the matching signal SIG_MATCH indicating that writing is impossible when the first position of the target write pointer and the second position of the current write pointer of the target zone are different from each other, or the first size of the data DQ is larger than the second size, the remaining storage space in the target zone.

However, the present inventive concepts are not limited thereto, and the zone manage circuit 301 may determine whether the storage device 200 may perform a write operation through various comparison operations.

The FTL 303 may include firmware or software that manages data writing, data reading, and sub-block and/or block erase operations of the non-volatile memory 400. Firmware of the FTL 303 may be executed by the processor 307. In some example embodiments, the FTL 303 may be implemented through various hardware automation circuits configured to perform the various maintenance operations described above. For example, the FTL 303 may be implemented as hardware, and various maintenance operations described above may be performed through the hardware.

The FTL 303 may perform various maintenance operations to efficiently use the non-volatile memory 400. For example, the FTL 303 may perform several functions such as address mapping, wear-leveling, and garbage collection.

The FTL 303 may change the logical block address (LBA) received from the host device 100 into a physical address for storing data in the user memory 4031. For example, the FTL 303 may map the logical block address LBA from the host device 100 and a user memory address UM_ADDR using a user address mapping table UM_MT. The FTL 303 may include the user address mapping table UM_MT, and, in some example embodiments, the user address mapping table UM_MT may include mapping information between the logical block address LBA and the user memory address UM_ADDR.

According to some example embodiments, wear leveling may be an operation to prevent or reduce excessive degradation of a specific, or alternatively desired block by equalizing a frequency or number of uses of a plurality of memory blocks included in the non-volatile memory 400. For example, wear leveling operations may be implemented through firmware or hardware that balances erase counts of physical blocks.

According to some example embodiments, garbage collection may be an operation that copies valid data from a block in the non-volatile memory 400 to a new block, and erases the existing block so that the existing block may be reused, in order to secure available capacity within the non-volatile memory 400.

In some example embodiments, the FTL 303 may store data necessary to perform operations of the FTL 303. For example, the FTL 303 may store block information of the non-volatile memory 400, a garbage collection level for performing garbage collection on the non-volatile memory 400, the user address mapping table UM_MT used to convert the logical block address LBA of the host device 100 to the physical address of the memory 4031, an address mapping table managed by garbage collection, or wear leveling operation, etc. However, the present inventive concepts are not limited thereto, and data for performing the operation of the FTL 303 may be stored in a buffer memory 309 or the non-volatile memory 400.

The reserved memory manage circuit 305 may perform various operations to use the reserved memory 4033. For example, the reserved memory manage circuit 305 may perform an address mapping operation.

The reserved memory manage circuit 305 may change the logical block address LBA received from the host device 100 into a physical address for storing data DATA in the reserved memory 4033. The reserved memory manage circuit 305 may map the logical block address LBA and a reserved memory address RM_ADDR from the host device 100 using a reserved address mapping table RM_MT. The reserved memory manage circuit 305 may include the reserved address mapping table RM_MT that includes mapping information between the reserved memory address RM_ADDR in which data DATA is written and the logical block address LBA.

In some example embodiments, the reserved memory address RM_ADDR may be set according to the size of the reserved memory 4033 set by the host device 100. The reserved memory manage circuit 305 may generate the reserved address mapping table RM_MT based on a size of the reserved memory 4033.

The processor 307 may control the overall operation of the storage controller 300. The processor 307 may control the storage controller 300 by running firmware loaded on the FTL 303. In some example embodiments, the processor 307 may include a central processing unit (CPU), a controller, or an application specific integrated circuit (ASIC), but example embodiments are not limited thereto.

The processor 307 may run various firmware or software running on the storage controller 300. The processor 307 may use the buffer memory 309 as an operation memory of the processor 307. In some example embodiments, the processor 307 may use the non-volatile memory 400 as an operation memory of the processor 307. For example, the processor 307 may control a data read operation from the non-volatile memory 400 and a data write operation to the non-volatile memory 400 by executing firmware.

In some example embodiments, the processor 307 may determine processing of the request signal REQ received from the host device 100 based on the matching signal SIG_MATCH.

In some example embodiments, when the processor 307 receives the matching signal SIG_MATCH indicating that writing is possible from the zone manage circuit 301, the processor 307 may write data DATA to the user memory 4031. For example, the processor 307 may refer to the user address mapping table UM_MT of the FTL 303 and write data DATA to the user memory address UM_ADDR corresponding to the logical block address LBA.

In some example embodiments, when the processor 307 receives the matching signal SIG_MATCH indicating that writing is impossible from the zone manage circuit 301, the processor 307 may temporarily write the data DATA in the reserved memory 4033 as preliminary data P_DATA. For example, the processor 307 may refer to the reserved address mapping table RM_MT of the reserved memory manage circuit 305 and write data DATA in the reserved memory address RM_ADDR corresponding to the logical block address LBA.

In some example embodiments, the processor 307 may generate a failure signal indicating that the request signal REQ received from the host device 100 cannot be processed. The failure signal may include the logical block address LBA and a reason for the write failure. Here, the logical block address LBA may be a logical block address corresponding to the request signal REQ that cannot be processed. In some example embodiments, reasons for write failure may include write pointer mismatch, lack of storage space, etc., but example embodiments are not limited thereto. The processor 307 may transmit, provide, or send a failure signal to the host device 100.

The host device 100 may generate a sync command based on the failure signal. In some example embodiments, the sync command may be a signal instructing the storage device 200 to move and store the preliminary data P_DATA in the user memory 4031. In some example embodiments, the sync command may be a signal that changes the position of the target write pointer to the position of the current write pointer in the target zone. The sync command may include a logical block address LBA, etc., but example embodiments are not limited thereto. For example, in some example embodiments, the sync command may further include a task tag, IID, expected data transmission length, etc.

The host device 100 may transmit, provide, or send a sync command to the storage device 200. The processor 307 may read the preliminary data P_DATA in response to receiving a sync command from the host device 100 and write the read data into the user memory 4031. For example, the processor 307 may read the preliminary data P_DATA stored in the reserved memory address RM_ADDR corresponding to the logical block address LBA based on the reserved address mapping table RM_MT. Afterwards, in some example embodiments, the processor 307 may write the read preliminary data P_DATA to the user memory 4031.

For example, the storage device 200 may receive a request signal including a write command to write first data to the first logical block address. Hereinafter, a request signal including a write command is referred to as a write request. In some example embodiments, the processor 307 may determine that writing the first data has failed based on the matching signal SIG_MATCH received from the zone manage circuit 301, and write the first data to the reserved memory 4033. For example, the processor 307 may write the first data to the reserved memory 4033 based on the reserved address mapping table RM_MT of the reserved memory manage circuit 305. The processor 307 may generate a failure signal including a first logical block address and transmit, provide or send the failure signal to the host device 100.

In some example embodiments, if the failure signal includes a reason for the write failure indicating a mismatch of the write pointer, the sync command may include the logical block address LBA. For example, the host device 100 may generate a sync command including the first logical block address in response to receiving a failure signal. The host device 100 may transmit, provide, or send a sync command to the storage device 200. The processor 307 may read the first data in response to receiving the sync command. For example, the processor 307 may read the first data stored in the first reserved memory address corresponding to the first logical block address based on the reserved address mapping table RM_MT. Thereafter, the processor 307 may write first data to the position of the current write pointer of the target zone indicated by the first logical block address.

In some example embodiments, if the failure signal includes a reason for write failure indicating lack of storage space, the sync command may include a new logical block address LBA. For example, the host device 100 may generate a sync command including a new second logical block address. The host device 100 may transmit, provide, or send a sync command to the storage device 200. In some example embodiments, the zone manage circuit 301 may derive, or alternatively determine, a zone address that indicates a new target zone based on a new second logical block address and a new target write pointer.

The processor 307 may read the first data in response to receiving the sync command. For example, the processor 307 may read the first data stored in the first reserved memory address corresponding to the first logical block address based on the reserved address mapping table RM_MT. In some example embodiments, the processor 307 determines whether the first data may be written in the new target zone indicated by the second logical block address, and if so, the processor 307 may write the first data at the position of the current write pointer in the new target zone.

Referring again to FIG. 2, the buffer memory 309 may store commands and data that are executed and processed by the storage controller 300. The buffer memory 309 may temporarily store data stored in the non-volatile memory 400 or may temporarily store data that is to be stored in the non-volatile memory 400.

The buffer memory 309 may be implemented as a volatile memory such as dynamic random access memory (DRAM), static RAM (SRAM), etc. However, example embodiments are not limited thereto, and, in some example embodiments, the buffer memory 309 may be implemented by various types of non-volatile memory, including a resistive non-volatile memory such as magnetic RAM (MRAM), phase change RAM (PRAM), or resistive RAM (ReRAM), or the like, flash memory, nano floating gate memory (NFGM), polymer random access memory (PoRAM), or ferroelectric random access memory (FRAM), or the like.

In some example embodiments, the buffer memory 309 may store code data required for initial booting of the storage device 200. The buffer memory 309 may buffer logical block addresses LBA, request signals REQ, data DATA, commands, etc., received from the host 100, but example embodiments are not limited thereto. Signals buffered in the buffer memory 309 may be transferred, provided, or sent to the non-volatile memory 400 through the memory interface 313 and used, for example, by the non-volatile memory 400. For example, data buffered in the buffer memory 309 may be written to the non-volatile memory 400.

While the buffer memory 309 is shown as being provided or located inside the storage controller 300, example embodiments of the present inventive concepts are not limited thereto, and, in some example embodiments, the buffer memory 309 may be provided or located outside the storage controller 300.

The memory interface 313 may provide signal transmission and reception with the non-volatile memory 400. For example, the memory interface 313 may transmit, provide, or send commands and control signals along with data, to be written to the non-volatile memory 400, to the non-volatile memory 400. For example, the memory interface 313 may also receive data read from the non-volatile memory 400. According to some example embodiments, the memory interface 313 may be implemented to comply with standard protocols such as Toggle or ONFI.

Figure 4:
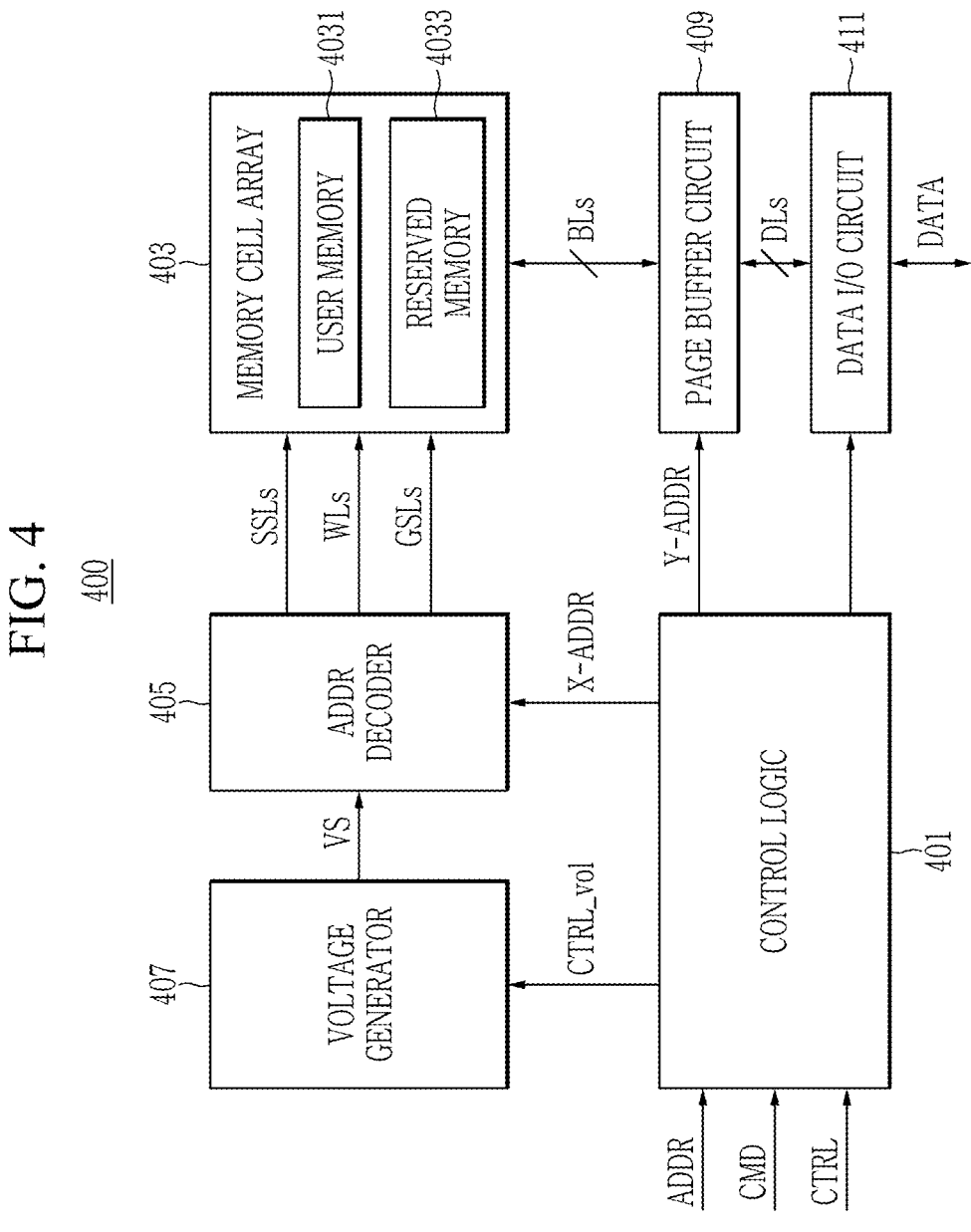
FIG. 4 is a block diagram illustrating an example of a non-volatile memory according to some example embodiments.
Figure 5:
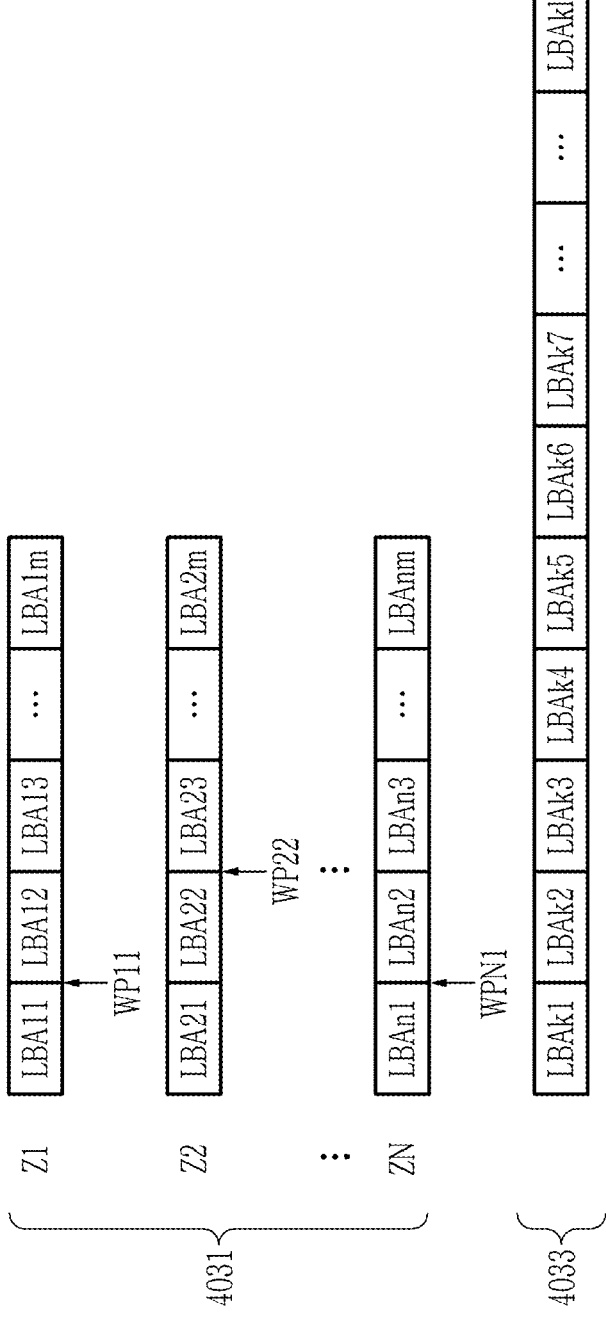
FIG. 5 illustrates a memory cell array according to some example embodiments.

FIG. 4 is a block diagram illustrating an example of a non-volatile memory according to some example embodiments. FIG. 5 illustrates a memory cell array according to some example embodiments.

Referring to FIG. 4, the non-volatile memory 400 includes a control logic 401, a memory cell array 403, an address decoder 405, a voltage generator 407, a page buffer circuit 409, and a data input/output circuit 411.

The control logic 401 may receive a command CMD and an address ADDR from the storage controller 300 of FIG. 2, and may control an erase operation, a write operation and a read operation of the non-volatile memory 400 based on the command CMD and the address ADDR.

For example, the control logic 401 may generate control signals CTRL_vol for controlling the voltage generator 407 and control signals for controlling the page buffer circuit 409 based on the command CMD, and may generate a row address X_ADDR and a column address Y_ADDR based on the ADDR. The control logic 401 may provide the row address X_ADDR to the address decoder 405 and the column address Y_ADDR to the page buffer circuit 409.

The memory cell array 403 is connected to the address decoder 405 through a plurality of string select lines SSLs, a plurality of word lines WLs, and a plurality of ground select lines GSLs. In some example embodiments, the memory cell array 403 is connected to the page buffer circuit 409 through a plurality of bit lines BLs. The memory cell array 403 may include a plurality of memory cells connected to the plurality of word lines WLs and the plurality of bit lines BLs. In some example embodiments, the memory cell array 403 may be formed in a two-dimensional (2D) array structure or a three-dimensional (3D) vertical array structure.

The memory cell array 403 may include the user memory 4031 and the reserved memory 4033.

Referring to FIG. 5, in some example embodiments, the user memory 4031 may include first to Nth zones Z1 to ZN. N may be any natural number. A logical region may include an address identifiable by the host device 100. For example, each of the plurality of zones Z1 to ZN may include a corresponding zone address. One zone ZN may include a plurality of logical block addresses LBA. In some example embodiments, a plurality of blocks in which the addresses ADDR are adjacent to each other may be included in one zone ZN. The first to Nth zones Z1 to ZN may be independent from each other. According to some example embodiments, the physical region may include the position or address of a memory block in the non-volatile memory 400. Logical regions and physical regions may have a mapping relationship.

In some example embodiments, for example, as shown in FIG. 5, the storage space of the first zone Z1 may correspond to 11th to 1mth logical block addresses LBA11 to LBA1*m*. The storage space of the second zone Z2 may correspond to 21st to 2mth logical block addresses LBA21 to LBA2*m*. The storage space of the Nth zone ZN may correspond to n1th to nmth logical block addresses LBAn1 to LBAnm. While each of the 1st to Nth zones Z1 to ZN is shown as corresponding to m logical block addresses, example embodiments of the present inventive concepts are not limited thereto, and, in some example embodiments, each of the 1st to Nth zones Z1 to ZN may correspond to arbitrary number of logical block addresses.

The storage controller 300 may manage data corresponding to the write request received from the host device 100 to be stored logically physically sequentially in the user memory 4031. For example, the storage controller 300 may support sequential writing.

The storage controller 300 may sequentially store data in the user memory 4031 using a write pointer. The write pointer may include information about the position to write data within the storage device 200. Referring to FIG. 5, in some example embodiments, the first zone Z1 may include a first write pointer WP11 indicating a logical block address LBA12. The second zone Z2 may include a second write pointer WP22 indicating a logical block address LBA23. The Nth zone ZN may include an nth write pointer WPN1 indicating a logical block address LBAn2.

According to some example embodiments, logical block addresses may each correspond to sequential sub-blocks or sequential programming units (e.g., units in which programming is performed on memory cells) within one block, while maintaining logical sequentially. The correspondence relationship between logical block addresses and memory blocks may be modified and implemented in various different ways by those of ordinary skill in the art to which the present inventive concepts pertain.

In some example embodiments, a memory block may be a unit of execution of an operation request. The user memory 4031 may receive a write request or a read request from the storage controller 300. For example, the write request may include a write command CMD, an address ADDR, and data DATA. For example, the read request may include a read command CMD and an address ADDR. The user memory 4031 may perform a task corresponding to an operation request. For example, when receiving a write request, the user memory 4031 may write the received data DATA in the block corresponding to the address ADDR. For example, when receiving a read request, the user memory 4031 may read data stored in a memory block corresponding to the address ADDR.

In some example embodiments, the user memory 4031 may be a triple level cell (TLC) region.

The reserved memory 4033 may include a plurality of logical block addresses LBAk1 to LBAkl. As shown in FIG. 5, the reserved memory 4033 may correspond to L logical block addresses. In some example embodiments, L may be a multiple of m.

In some example embodiments, the reserved memory 4033 may be a single level cell (SLC) region.

Referring again to FIG. 4, in some example embodiments, the address decoder 405 may be connected to the memory cell array 403 through the plurality of string select lines SSLs, the plurality of word lines WLs, and the plurality of ground select lines GSLs.

The voltage generator 407 may generate a voltage VS required for operation of the non-volatile memory 400 based on the power voltage and control signals CTRL_vol. For example, the voltage generator 407 may generate a voltage signal VS for the operation of the non-volatile memory 400 based on a power voltage and the control signals CTRL_vol. The voltage VS may be applied to the plurality of string select lines SSLs, the plurality of word lines WLs, and the plurality of ground select lines GSLs through the address decoder 405. In some example embodiments, the voltage generator 407 may generate an erase voltage required for an erase operation based on the power supply voltage and control signals CTRL_vol. An erase voltage VERS may be applied directly to the memory cell array 403 or may be applied through the bit line BL. For example, in some example embodiments, the voltage generator 407 may generate an erase voltage signal for an erase operation and directly transfer, send, or provide the erase voltage signal for the erase operation to the memory cell array 403. In some example embodiments, the voltage generator 407 may generate the erase voltage signal and transfer, send, or provide the erase voltage signal to the memory cell array 403 through the bit line BL.

The page buffer circuit 409 may be connected to the memory cell array 403 through a plurality of bit lines BLs. The page buffer circuit 409 may include a plurality of page buffers. In some example embodiments, one bit line BL may be connected to one page buffer. In some example embodiments, two or more bit lines BLs may be connected to one page buffer.

The page buffer circuit 409 may store write data DATA to be written to the memory cell array 403 or read data DATA detected from the memory cell array 403. For example, the page buffer circuit 409 may operate as a write driver or a sense amplifier depending on an operation mode of the non-volatile memory 400.

The data input/output circuit 411 may be connected to the page buffer circuit 409 through data lines DLs. The data input/output circuit 411 may provide, transfer, or send write data DATA to the memory cell array 403 through the page buffer circuit 409, or provide, transfer, or send read data DATA output from the memory cell array 403 through the page buffer circuit 409 to the external (e.g., an outside).

While, for example, in FIGS. 1 to 5, the reserved memory 4033 is described as being included in the non-volatile memory 400, example embodiments of the present inventive concepts are not limited thereto, and, in some example embodiments, the reserved memory 4033 may also be included in the storage controller 300.

Figure 6:
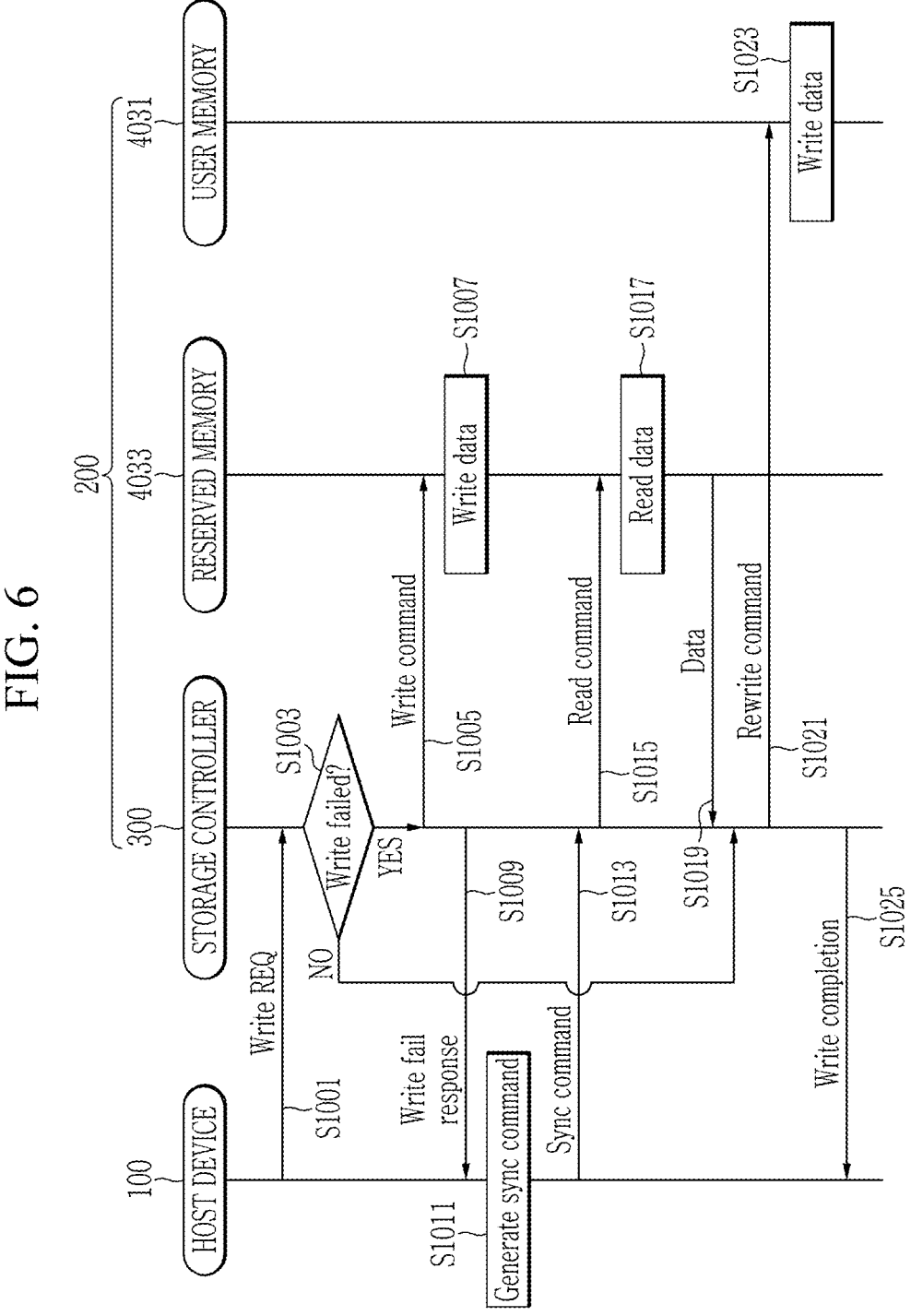
FIG. 6 illustrates an operating method of a storage system according to some example embodiments.

FIG. 6 illustrates an operating method of a storage system according to some example embodiments. For example, FIG. 6 illustrates an example embodiment where the storage device according to FIG. 1 fails to process a write request due to a mismatch in write pointers.

First, the host device 100 transmits, provides, or sends a write request Write REQ to the storage device 200 (S1001).

The write request write REQ may include a write command, write data, and a logical block address. The write request write REQ may include the first data and the first logical block address.

The storage controller 300 determines whether the write request has failed (S1003).

For example, in S1003, the storage controller 300 may derive, or alternatively determine, a zone address indicating a target zone to be written among a plurality of zones of the user memory 4031 in the storage device 200 and a position of the target write pointer to be written in the corresponding zone, based on the logical block address.

In some example embodiments, in S1003, the storage controller 300 may detect, or alternatively determine, the position of the current write pointer of the target zone of the logical block address.

For example, the storage controller 300 may derive, or alternatively determine, a zone address indicating the first zone and a target write pointer of the first position based on the first logical block address. In some example embodiments, the storage controller 300 may detect, or alternatively determine, that the position of the current write pointer of the first zone corresponding to the zone address is the second position. The storage controller 300 may compare the first position of the target write pointer and the second position of the current write pointer of the first zone.

In some example embodiments, if the first position and the second position are the same, the storage controller 300 may determine that the write request is successful, "NO" in S1003. In some example embodiments, if the first position and the second position are different, the storage controller 300 may determine that the write request has failed, "YES" in S1003.

For example, if the storage controller 300 determines that the write request is successful, NO in S1003, the storage controller 300 transmits, provides, or sends a write command to the user memory 4031 (S1021).

For example, the storage controller 300 may write data to a position corresponding to the logical block address of the user memory 4031.

For example, the storage controller 300 may write the first data in a position corresponding to the first logical address of the user memory 4031.

Afterwards, the storage controller 300 transmits, provides, or sends a write completion response to the host device 100 (S1025).

In some example embodiments, if the storage controller 300 determines that the write request has failed, "YES" in S1003, the storage controller 300 transmits, provides, or sends a write command to the reserved memory 4033 (S1005).

For example, the storage controller 300 may determine a reserved memory address corresponding to a logical block address in a write request based on a reserved address mapping table that includes mapping information between logical block addresses and reserved memory addresses. The storage controller 300 may transmit, provide, or send a write command, write data, and a reserved memory address to the reserved memory 4033.

For example, the storage controller 300 may determine that the first reserved memory address corresponds to the first logical block address, and control the reserved memory 4033 to write the first data into the first reserved memory address of the reserved memory 4033.

The reserved memory 4033 writes data (S1007).

For example, in response to receiving a write command from the storage controller 300, the reserved memory 4033 may store the first data received from the storage controller 300 in a position corresponding to the first reserved memory address as preliminary data.

The storage controller 300 transmits, provides, or sends a failure signal to the host device 100 (S1009), for example, a write fail response.

The failure signal may include the logical block address and the reason for the write failure. For example, the failure signal may include a reason for write failure due to mismatch between the first logical block address and the write pointer corresponding to the first reserved memory address where the preliminary data is written.

The host device 100 generates a sync command (S1011) in response to receiving the write fail response.

For example, the host device 100 may generate a sync command based on a failure signal. For example, when receiving a failure signal indicating a write pointer mismatch, the host device 100 may generate a sync command including the received logical block address. For example, the sync command may further include a task tag, IID, expected data transmission length, etc., but example embodiments are not limited thereto.

The host device 100 transmits, provides, or sends a sync command to the storage device 200 (S1013).

The storage controller 300 transmits, provides, or sends a read command to the reserved memory 4033 (S1015).

The storage controller 300 may read the preliminary data written in the reserved memory address corresponding to the logical block address in the sync command based on the reserved address mapping table.

For example, the storage controller may read the first data stored in the first reserved memory address corresponding to the first logical block address.

The reserved memory 4033 reads data corresponding to the read command (S1017).

The reserved memory 4033 transmits, provides, or sends the read data to the storage controller 300 (S1019).

The storage controller 300 transmits, provides, or sends a rewrite command to the user memory 4031 (S1021).

For example, the storage controller 300 may obtain the position of the current write pointer of the target zone corresponding to the logical block address. The storage controller 300 may write the read data according to the position of the current write pointer of the target zone in the user memory 4031.

For example, the storage controller 300 may rewrite the first data to the second position of the current write pointer of the first zone corresponding to the first logical block address.

Afterwards, the storage controller 300 transmits, provides, or sends a write completion response to the host device 100 (S1025).

Figure 7:
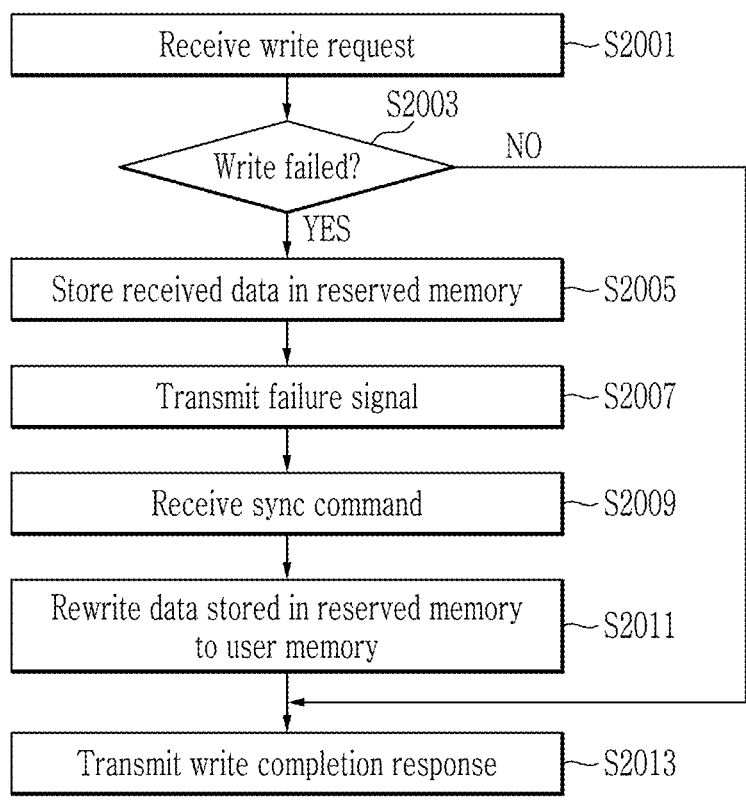
FIG. 7 illustrates an operating method of a storage system according to some example embodiments.

FIG. 7 illustrates an operating method of a storage system according to some example embodiments.

First, the storage device 200 receives a write request (S2001).

The write request may include a write command, write data, and a logical block address.

The storage device 200 determines whether the write request has failed (S2003).

For example, in S2003, the storage device 200 may compare the first position of the write pointer of the logical block address in the write request with the second position of the current write data in the target zone corresponding to the logical block address.

In some example embodiments, if it is determined that the write request was successful, "NO" in S2003, the storage device 200 may perform a operation of storing the received data in the user memory 4031 and transmitting, providing, or sending of a write completion response (S2013).

In some example embodiments, if it is determined that the write request has failed, "YES" in S2003, the storage device 200 stores the received data in the reserved memory 4033 (S2005).

The storage device 200 transmits, provides, or sends a failure signal to the host device 100 (S2007).

The failure signal may include a logical block address and a reason for write failure. The host device 100 may generate a sync command based on the failure signal.

The storage device 200 receives a sync command (S2009).

The sync command may include a logical block address. The storage device 200 may read preliminary data written in the reserved memory 4033 based on the sync command.

The storage device 200 rewrites data stored in the reserved memory 4033 to the user memory 4031 (S2011).

The storage device 200 may rewrite the read data to the user memory 4031.

The storage device 200 transmits, provides, or sends a write completion response (S2013).

Figure 8:
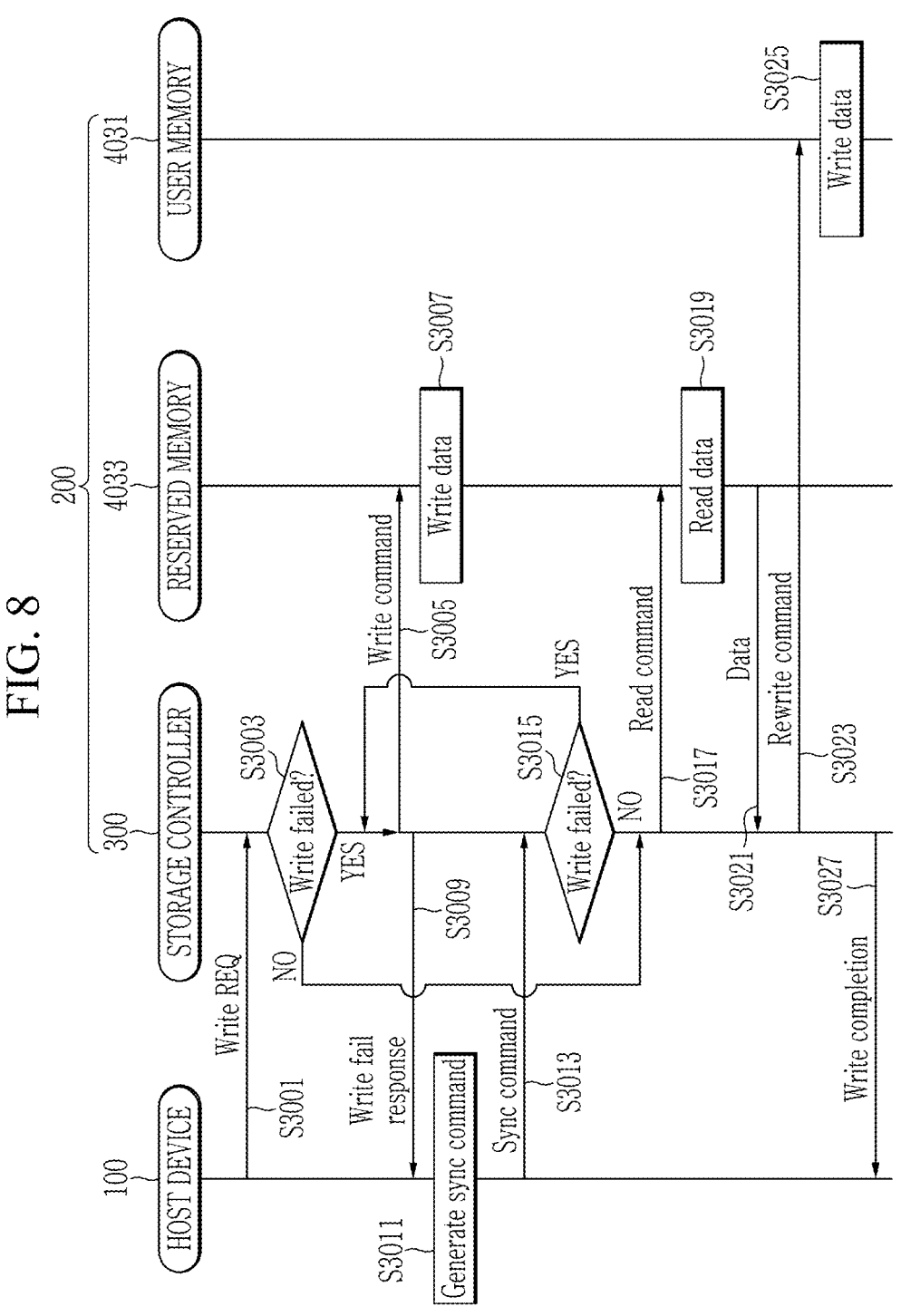
FIG. 8 illustrates an operating method of a storage system according some example embodiments.

FIG. 8 illustrates an operating method of a storage system according to some example embodiments. For example, FIG. 8 illustrates an example embodiment where write fails due to insufficient storage space in the user memory 4031 within the storage device 200.

First, the host device 100 transmits, provides, or sends a write request to the storage device 200 (S3001).

The write request may include a write command, write data, and a logical block address. The write request may include the first data and the first logical block address.

The storage controller 300 determines whether the write request has failed (S3003).

For example, the storage controller 300 may derive, or alternatively determine, a zone address indicating a target zone to be written among a plurality of zones of the user memory 4031 in the storage device 200 and a position of the target write pointer to be written in the corresponding zone, based on the logical block address. In some example embodiments, the storage controller 300 may detect the position of the current write pointer of the target zone of the logical block address.

Thereafter, in some example embodiments, the storage controller 300 may compare the size of data received from the host device 100 and the size of the remaining storage space in the target zone.

For example, the storage controller 300 may derive, or alternatively determine, the position of the target zone and target write pointer based on the logical block address received from the host device 100. The storage controller 300 may determine whether the position of the current write pointer of the target zone and the position of the target write pointer are the same. In some example embodiments, if the position of the current write pointer and the target write pointer are the same, the storage controller 300 may compare the size of the data and the size of the remaining storage space in the target zone. In some example embodiments, if the size of the data is larger than the size of the remaining storage space, the storage controller 300 may determine that the write request has failed, "YES" in S3003.

For example, the storage controller 300 may determine whether the first position of the first zone is the same as the position of the current write pointer of the first zone. If the storage controller 300 determines that the first position and the position of the current write pointer are the same, the storage controller 300 may compare the size of the first data and the size of the remaining storage space in the first zone.

For example, if the size of the first data is smaller than or equal to the size of the remaining storage space in the first zone, the storage controller 300 may determine that the write request is successful, "NO" in S3003. In some example embodiments, if the size of the first data is larger than the size of the remaining storage space in the first zone, the storage controller 300 may determine that the write request has failed, "YES" in S3003.

If the storage controller 300 determines that the write request is successful, "NO" in S3003, the storage controller 300 transmits, provides, or sends a write command to the user memory 4031 (S3023).

For example, the storage controller 300 may write the first data in a position corresponding to the first logical address of the user memory 4031 (S3025).

Afterwards, the storage controller 300 transmits, provides, or sends a write completion response to the host device 100 (S3027).

In some example embodiments, if the storage controller 300 determines that the write request has failed, "YES" in S3003, the storage controller 300 transmits, provides, or sends a write command to the reserved memory 4033 (S3005).

The storage controller 300 may determine a reserved memory address corresponding to a logical block address in a write request based on a reserved address mapping table that includes mapping information between logical block addresses and reserved memory addresses. The storage controller 300 may transmit, provide, or send a write command, write data, and a reserved memory address to the reserved memory 4033 (S3005).

For example, the storage controller 300 may determine that the first reserved memory address corresponds to the first logical block address, and control the reserved memory 4033 to write the first data into the first reserved memory address of the reserved memory 4033 (S3007).

The reserved memory 4033 writes data (S3007).

The storage controller 300 transmits, provides, or sends a failure signal to the host device 100 (S3009) indicating a write fail response.

The failure signal may include a logical block address corresponding to the preliminary data and a reason for write failure. For example, the failure signal may include a first logical block address corresponding to the first reserved memory address where preliminary data is written and a reason for write failure due to insufficient storage space.

The host device 100 generates a sync command (S3011).

For example, the host device 100 may generate a sync command based on a failure signal. In some example embodiments, when receiving a failure signal indicating insufficient storage space, the host device 100 may generate a sync command including a new logical block address (S3011). The new logical block address may indicate a target zone that is different from the target zone of the logical block address transmitted, sent, or provided to the storage device 200 in operation S3001. For example, the host device 100 may generate a sync command (S3011) that includes a logical block address that is different from the logical block address of a previously transmitted, provided, or send write request (S3001).

For example, the host device 100 may generate a second logical block address including a zone address indicating a second zone different from the first zone and a corresponding write pointer based on the failure signal. The host device 100 may generate a sync command (S3011) including a second logical block address. For example, the sync command may further include a task tag, IID, expected data transmission length, etc.

The host device 100 transmits, provides, or sends the generated sink sync command to the storage device 200 (S3013).

The storage controller 300 determines whether the write request has failed (S3015).

The storage controller 300 may derive, or alternatively determine, the position of the new target zone and the new target write pointer based on the new logical block address of the sync command. The storage controller 300 may determine whether the position of the current write pointer of the new target zone and the position of the new target write pointer are the same. In some example embodiments, if the position of the current write pointer and the new target write pointer are the same, the storage controller 300 may compare the size of the data DQ and the size of the remaining storage space of the new target zone. In some example embodiments, if the size of data DQ is larger than the size of the remaining storage space, the storage controller 300 may determine that the write request has failed, "YES" S3015.

In some example embodiments, if the storage controller 300 determines that the write request is successful, "NO" in S3015, the storage controller 300 transmits, provides, or sends a read command to the reserved memory 4033 (S3017).

In some example embodiments, if the storage controller 300 determines that the write request has failed, "YES" in S3015, operation S3005 may be performed again.

The reserved memory 4033 reads data corresponding to the read command (S3019).

The reserved memory 4033 transmits, provides, or sends the read data to the storage controller 300 (S3021).

The storage controller 300 transmits, provides, or sends a rewrite command to the user memory 4031 (S3023).

Afterwards, the storage controller 300 transmits, provides, or sends a write completion response to the host device 100 (S3027).

Figure 9:
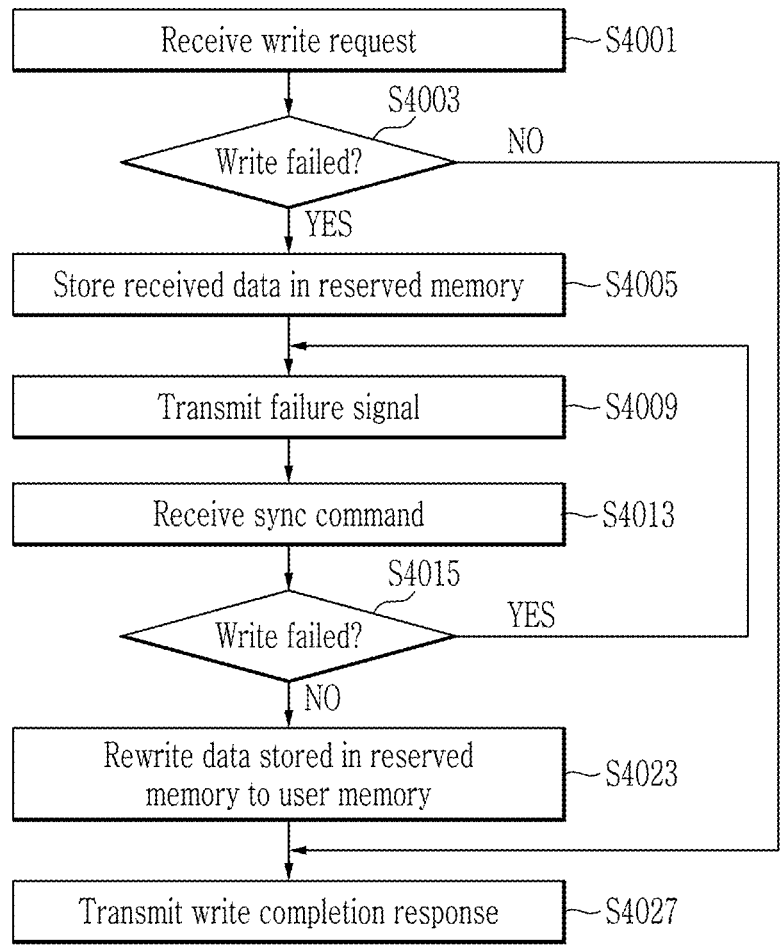
FIG. 9 illustrates an operating method of a storage system according to some example embodiments.

FIG. 9 illustrates an operating method of a storage system according to some example embodiments.

First, the storage device 200 receives a write request (S4001).

The write request may include a write command, write data, and a logical block address.

The storage device 200 determines whether the write request has failed (S4003).

For example, the storage device 200 may compare the first position of the write pointer of the logical block address in the write request with the second position of the current write data in the target zone corresponding to the logical block address. In some example embodiments, if the first position and the second position are the same, the storage device 200 may compare the size of the data DQ received from the host device 100 with the size of the remaining storage space in the target zone.

In some example embodiments, if it is determined that the write request is successful, "NO" in S4003, the storage device 200 stores the received data in the user memory 4031 and transmits, provides, or sends a write completion response (S4027).

In some example embodiments, if it is determined that the write request has failed, "YES" in S4003, the storage device 200 stores the received data in the reserved memory 4033 (S4005).

The storage device 200 transmits, provides, or sends a failure signal to the host device 100 (S4009).

The failure signal may include the logical block address and the reason for the write failure. The host device 100 may generate a sync command based on the failure signal.

The storage device 200 receives the sync command (S4013).

The host device 100 may generate the sync command including a new logical block address based on the failure signal. For example, if the host device 100 receives a failure signal indicating insufficient storage space, the host device 100 may generate the sync command including a new logical block address.

The storage device 200 determines whether the write request has failed (S4015).

In some example embodiments, if it is determined that the write request has failed, "YES" in S4015, the storage device 200 may perform operation S4009 again.

In some example embodiments, if it is determined that the write request is successful, "NO" in S4015, the storage device 200 rewrites the data stored in the reserved memory 4033 to the user memory 4031 (S4023).

The storage device 200 may rewrite the read data to the user memory 4031 (S4023).

The storage device 200 transmits, provides, or sends a write completion response (S4027) to the host 100.

Figure 10:
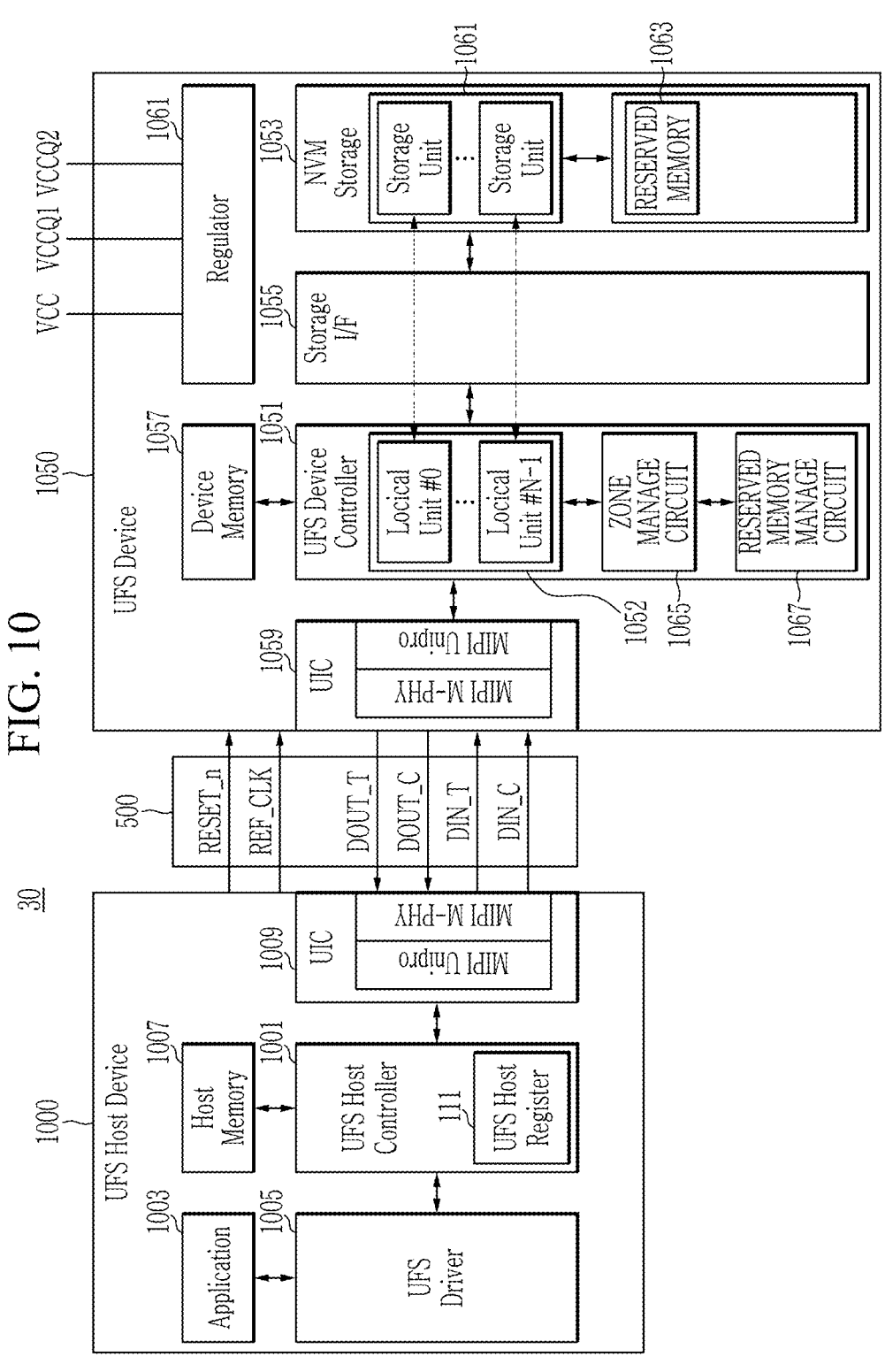
FIG. 10 illustrates a storage system according to some example embodiments.

FIG. 10 illustrates a storage system according to some example embodiments.

For example, FIG. 10 illustrates that the storage system (10 in FIG. 1) described with reference to FIGS. 1 to 9 is a system that complies with the Universal Flash Storage (UFS) standard announced by the Joint Electron Device Engineering Council (JEDEC) according to some example embodiments.

Referring to FIG. 10, a UFS system 30 may include a UFS host device 1000, a UFS device 1050, and a UFS interface 500.

The UFS host device 1000 and the UFS device 1050 may be interconnected through the UFS interface 500. In some example embodiments, the UFS host device 1000 may be implemented as part of an application processor, but example embodiments are not limited thereto.

The UFS host device 1000 may include a UFS host controller 1001, an application 1003, a UFS driver 1005, a host memory 1007, and a UFS interconnect (UIC) layer 1009.

The UFS device 1050 may include a UFS device controller 1051, a non-volatile storage 1053, a storage interface 1055, a device memory 1057, an UIC layer 1059, and a regulator 1061.

The non-volatile storage 1053 may include a plurality of storage units 1061 and a reserved memory 1063.

The plurality of storage units 1061 may include V-NAND flash memory in a 2D structure or a 3D structure, but example embodiments of the present inventive concepts are not limited thereto, and, in some example embodiments, each of the plurality of storage units 1061 may also include other types of non-volatile memory such as PRAM and/or RRAM.

In some example embodiments, the plurality of storage units 1061 may be divided into a plurality of zones to force sequential writing. Random writing may be prohibited within the plurality of storage units 1061. The write pointer may indicate the position where the next data will be written in each zone. As data is written to each zone, the corresponding write pointer may be updated.

The reserved memory 1063 may store preliminary data to be stored in the plurality of storage units 1061.

The UFS device controller 1051 and the non-volatile storage 1053 may be connected to each other through the storage interface 1055. The storage interface 1055 may be implemented to comply with standard protocols such as Toggle or ONFI, but example embodiments are not limited thereto.

The application 1003 of the UFS Host Device 1000 may be a program that communicates with the UFS device 1050 to use the functions of the UFS device 1050. The application 1003 may transmit, provide, or send an input-output request (IOR) to the UFS driver 1005 of the Host Device 1000 for input/output to the UFS device 1050. The input/output request may mean a data read request, write request, and/or erase request, but example embodiments of the present inventive concepts are not limited thereto.

The UFS driver 1005 may manage the UFS host controller 1001 through a UFS-HCI (host controller interface). The UFS driver 1005 may convert the input/output request generated by the application 1003 into a UFS command defined by the UFS standard and may transmit, provide, or send the converted UFS command to the UFS host controller 1001. One input/output request may be converted into a plurality of UFS commands. UFS commands may basically be commands defined by the SCSI (Small Computer System Interface) standard, but example embodiments are not limited thereto, and, in some example embodiments, may also be commands exclusive to the UFS standard.

The UFS host controller 1001 may transmit, provide, or send the UFS command converted by the UFS driver 1005 to the UIC layer 1059 of the UFS device 1050 through the UIC layer 1009 of the UFS Host Device 1000 and the UFS interface 500. For example, a UFS host register 111 of the UFS host controller 1001 may function as a command queue (CQ). The UIC layer 1009 on the UFS host device 1000 side may include MIPI M-PHY and MIPI UniPro, and the UIC layer 1059 on the UFS device 1050 side may also include MIPI M-PHY and MIPI UniPro.

The UFS interface 500 may include a line transmitting, providing, or sending a reference clock REF_CLK, a line transmitting, providing, or sending a hardware reset signal RESET_n for the UFS device 1050, and a pair of lines transmitting, providing, or sending a pair of differential input signals DIN_T and DIN_C, and a pair of lines transmitting, providing, or sending a pair of differential output signals DOUT_T and DOUT_C.

The UFS device 1050 may generate clocks of various frequencies from a reference clock provided from the UFS host device 1000 using a phase-locked loop (PLL) or the like. In some example embodiments, the UFS host device 1000 may set the value of the data rate between the UFS host device 1000 and the UFS device 1050 through the frequency value of the reference clock. For example, the value of the data rate may be determined depending on the frequency value of the reference clock.

The UFS device controller 1051 may include a plurality of logic units 1052, a zone manage circuit 1065, and a reserved memory manage circuit 1067.

The zone manage circuit 1065 may manage the write pointer (WP) position of each of the plurality of zones within the plurality of storage units 1061. In some example embodiments, the zone manage circuit 1065 may compare the position of the target write pointer of the target zone in the command received from the UFS host device 1000 with the position of the current write pointer of the target zone within the plurality of storage units 1061. In some example embodiments, the zone manage circuit 1065 may compare the size of data received from the UFS host device 1000 with the size of the remaining storage space in the target zone.

The reserved memory manage circuit 1067 may perform an address mapping operation of the reserved memory 1063.

The UFS interface 500 may support multiple lanes, and each lane may be implemented as a differential pair. For example, the UFS interface 500 may include one or more receive lanes and one or more transmit or send lanes. In FIG. 10, a pair of lines transmitting, providing, or sending a pair of differential input signals DIN_T and DIN_C may constitute a receive lane, and a pair of lines transmitting, providing, or sending a pair of differential output signals DOUT_T and DOUT_C may constitute a transmit or send lane. Although FIG. 10 illustrates one transmit or send lane and one receive lane, example embodiments are not limited thereto, and the number of transmit or send lanes and receive lanes may be modified.

The receive lane and the transmit or send lane may transmit, provide, or send data through a serial communication method, and the communication between the UFS host device 1000 and the UFS device 1050 is possible in full-duplex method by the structure in which the receive lane and the transmit or send lane are separated. For example, the UFS device 1050 may transmit, provide, or send data to the UFS host device 1000 through the transmission or send lane even while receiving data from the UFS host device 1000 through the same transmission or send lane. In some example embodiments, control data, such as commands from the UFS host device 1000 to the UFS device 1050, and user data that the UFS host device 1000 wishes to store in or extract from the non-volatile storage 1053 of the UFS device 1050 may be transmitted, provided, or sent through the same lane. Accordingly, there may be no need, or alternatively advantage, to provide a separate lane for data transmission between the UFS host device 1000 and the UFS device 1050 in addition to a pair of receive lanes and a pair of transmit or send lanes.

Figure 11:
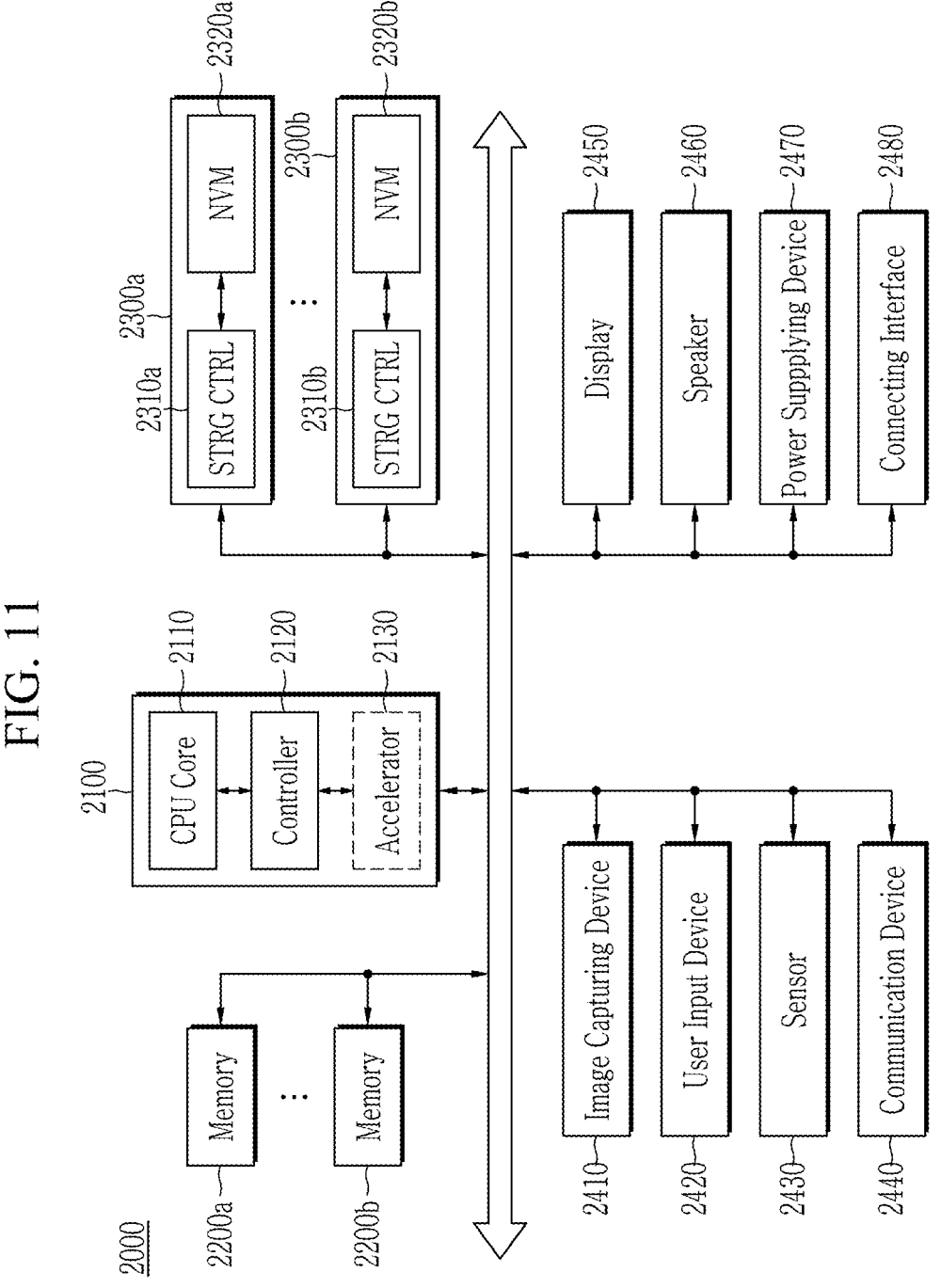
FIG. 11 illustrates a storage system according to some example embodiments.

FIG. 11 illustrates a storage system according to some example embodiments.

A system 2000 of FIG. 11, according to some example embodiments, may be a mobile system such as a mobile phone, a smartphone, a tablet personal computer (PC), a wearable device, a healthcare device, or an Internet of Things (IoT) device. However, example embodiments of the system 2000 of FIG. 12 are not necessarily limited to a mobile system and, in some example embodiments, may include a personal computer, a laptop computer, a server, a media player, or automobile device such as a navigation device.

Referring to FIG. 11, the system 2000 may include a main processor 2100, memories 2200a and 2200b, and storage devices 2300a and 2300b. In some example embodiments, the system 2000 may include at least one of an image capturing device 2410, a user input device 2420, a sensor 2430, a communication device 2440, a display 2450, a speaker 2460, a power supplying device 2470, and a connecting interface 2480.

The main processor 2100 may control the overall operation of the system 2000. In some example embodiments, the main processor 2100 may be implemented with a general-purpose processor, a dedicated processor, or an application processor, but example embodiments are not limited thereto.

The main processor 2100 may include one or more CPU cores 2110 and may further include a controller 2120 for controlling the memories 2200a and 2200b and/or storage devices 2300a and 2300b. According to some example embodiments, the main processor 2100 may further include an accelerator 2130, which is a dedicated circuit for a high-speed data operation such as artificial intelligence (AI) data operation. The accelerator 2130 may include a graphics processing unit (GPU), a neural processing unit (NPU) and/or a data processing unit (DPU), but example embodiments are not limited thereto, and, in some example embodiments, the accelerator 2130 may also be implemented as a separate chip physically independent from the other components of the main processor 2100.

The memories 2200a and 2200b may be used as main memory device of the system 2000 and may include volatile memories such as SRAMs and/or DRAMs. However, the example embodiments are not limited thereto, and, in some example embodiments, the memories 2200a and 2200b may also include non-volatile memories such as flash memories, PRAMs, and/or RRAMs. The memories 2200a and 2200b may also be implemented in the same package as the main processor 2100.

The storage devices 2300a and 2300b may function as non-volatile storage devices that store data regardless of whether power is supplied thereto, and may have a relatively large storage capacity as compared to the memories 2200a and 2200b. The storage devices 2300a and 2300b may include storage controllers 2310a and 2310b (STRG CTRL) and non-volatile memories (NVM) 2320a and 2320b that store data under the control of the storage controllers 2310a and 2310b. The non-volatile memories 2320a and 2320b may include a 2-dimensional (2D) structure or 3-dimensional (3D) V-NAND (Vertical NAND) flash memory, or may include other types of non-volatile memory such as a PRAM and/or RRAM.

The storage devices 2300a and 2300b may be included in the system 2000 while being physically separated from the main processor 2100 or may be implemented in the same package as the main processor 2100. In some example embodiments, the storage devices 2300a and 2300b may have a shape the same as that of a solid state device (SSD) or a memory card, such that the storage devices 2300 *a* and 2300 *b* may be coupled to be attached to and detached from the other components of the system 2000 through an interface such as a connection interface 2480. The storage devices 2300a and 2300b may be configured to as devices to which standard conventions such as universal flash storage (UFS), embedded multi-media card (eMMC), or non-volatile memory express (NVMe) are applied, but example embodiments are not limited thereto.

The image capturing device 2410 may obtain a still image or a video, and may be a camera, a camcorder, and/or a webcam, but example embodiments are not limited thereto.

The user input device 2420 may receive various types of data input from a user of the system 2000, and may include a touch pad, a keypad, a keyboard, and a mouse and/or a microphone, but example embodiments are not limited thereto.

The sensor 2430 may detect various types of physical quantities that can be obtained from an external entity of the system 2000 and may convert the detected physical quantities into an electrical signal. The sensor 2430 may be a temperature sensor, a pressure sensor, a luminance sensor, a position sensor, an acceleration sensor, a biosensor, and/or a gyroscope sensor, but example embodiments are not limited thereto.

The communication device 2440 may transmit, provide, or send signals to and receive signals from other devices present externally of the system 2000 according to various communication protocols. The communication device 2440 may include an antenna, a transceiver, and/or a modem.

The display 2450 and the speaker 2460 may function as output devices for outputting visual and auditory information to a user of the system 2000.

The power supply device 2470 may appropriately convert power supplied from a battery (not shown) built in the system 2000 and/or an external power source and may supply the power to each component of the system 2000.

The connection interface 2480 may provide a connection between the system 2000 and an external device connected to the system 2000 and able to exchange data with the system 2000. The connection interface 2480 may be implemented by various interface methods such as advanced technology attachment (ATA), serial ATA (SATA), external SATA (e-SATA), small computer small interface (SCSI), serial attached SCSI (SAS), peripheral component interconnection (PCI), PCI express (PCIe), NVM express (NVMe), IEEE 1394, universal serial bus (USB), secure digital (SD) card, multi-media card (MMC), embedded multi-media card (eMMC), universal flash storage (UFS), embedded universal flash storage (eUFS), compact flash (CF) card interface, and the like, but example embodiments are not limited thereto.

The storage devices 2300a and 2300b may correspond to the storage device 200 in FIG. 1 described with reference to FIGS. 1 to 9 and the UFS device 1050 described with reference to FIG. 10. The main processor 2100 may correspond to the host device 100 described with reference to FIG. 1 or the UFS host 1000 described with reference to FIG. 10.

The storage devices 2300a and 2300b may sequentially write the request signal received from the main processor 2100 within the storage devices 2300a and 2300b to the non-volatile memories 2320a and 2320b. The storage devices 2300a and 2300b may enable sequential writing of the non-volatile memories 2320a and 2320b without allocating additional resources for storing data corresponding to the request signal.

Meanwhile, in a conventional storage device including a plurality of zones that sequentially store data, when a write request including data is received from the host device and the storage device is unable to write the received data due to a mismatch in a write pointer or insufficient storage space, the storage device invalidates the received data and transmits information about a position of a current write pointer to the host device. Because the received data is invalidated by the storage device, the host device has to retransmit the data that is to be written to the storage device along with a write request that includes a position of an updated write pointer. In other words, conventionally, when a storage device fails to write data that the host device wants to write, the host device has to retransmit the data to the storage device multiple times. Therefore, in conventional storage devices there is a high ratio of overhead in the transmitting/receiving of signals between the host device and the storage device.

Meanwhile, the storage devices 2300a and 2300b, according to some example embodiments of the present inventive concepts, may store received data included in a write request in a separate reserved memory when the write request received from a host device cannot be written due to mismatch of the write pointer or insufficient storage space. The storage devices 2300a and 2300b may transmit, provide, or send, to the host device a reason for the write failure (e.g., the reason that the received data could not be processed) and an address corresponding to the received data that failed to be written. The host device may generate a sync command to control the storage devices 2300a and 2300b to write the data stored in the reserved memory of the storage devices 2300a and 2300b to an appropriate position based on the reason for the write failure.

For example, in some example embodiments, the host device may transmit, provide, or send the sync command to the storage devices 2300a and 2300b. The storage devices 2300a and 2300b, in response to receiving the sync command, may read the data stored in an arbitrary memory (e.g., the data stored in the reserved memory) and may rewrite the data to the appropriate position. Since the data is stored in the arbitrary memory (e.g., the reserved memory) of the storage devices 2300*a* and 2300*b*, the host device may not need to transmit, provide, or send the data to the storage devices 2300*a* and 2300*b* again. Accordingly, in some example embodiments, the overhead of signals transmitted, provided, or sent and received between the host device and the storage devices 2300*a* and 2300*b* may be reduced.

One or more of the elements disclosed above may include or be implemented in one or more processing circuitries such as hardware including logic circuits; a hardware/software combination such as a processor executing software; or a combination thereof. For example, the processing circuitries more specifically may include, but are not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Any or all of the elements described with reference to the figures may communicate with any or all other elements described with reference to the figures. For example, any element may engage in one-way and/or two-way and/or broadcast communication with any or all other elements in the figures, to transfer and/or exchange and/or receive information such as but not limited to data and/or commands, in a manner such as in a serial and/or parallel manner, via a bus such as a wireless and/or a wired bus. The information may be encoded in various formats, such as in an analog format and/or in a digital format.

While some example embodiments of the present inventive concepts have been described in detail, it is to be understood that the present inventive concepts are not limited to the disclosed example embodiments, but on the contrary, are intended to cover various modifications and equivalent arrangements included within the spirit and scope of the appended claims.

What is claimed is:

1. A storage device, comprising:
a non-volatile memory including:
    a first memory including a plurality of zones configured to sequentially store data based on a write pointer, the write pointer indicating a position to write the data, and
    a second memory configured to store preliminary data to be written in the plurality of zones; and
a storage controller configured to;
    receive a plurality of operation requests, each of the plurality of operation requests including a logical block address, a write command, and write data,
    store first write data corresponding to a first operation request in the second memory as first preliminary data, based on a position of a first logical block address corresponding to the first operation request among the plurality of operation requests and the write pointer not matching, and
    generate a failure signal indicating that the first operation request cannot be processed based on the first logical block address corresponding to the first operation request in response to a determination that the first operation request cannot be processed.

2. The storage device of claim 1, wherein
the storage controller comprises a zone manage circuit configured to determine, based on the logical block address, a target zone to write to among the plurality of zones and a target write pointer indicating a position to write to in the target zone, and
the zone manage circuit is configured to perform a first comparison operation to compare a first position of the target write pointer and a second position of a current write pointer of the target zone.

3. The storage device of claim 2, wherein
the zone manage circuit is configured to perform a second comparison operation to compare a first size of the first write data and a second size of a remaining storage space of the target zone.

4. The storage device of claim 3, wherein
the zone manage circuit is configured to generate a matching signal indicating whether the first operation request can be processed based on results of the first comparison operation and the second comparison operation.

5. The storage device of claim 4, wherein
the storage controller comprises a processor configured to determine the processing of the first operation request based on the matching signal, a mapping table between the logical block address and a second memory address of the second memory, and a mapping table between the logical block address and a first memory address of the first memory.

6. The storage device of claim 5, wherein
the processor is configured to write the first write data as the first preliminary data to the second memory address corresponding to the first logical block address based on the matching signal indicating that the first operation request cannot be processed.

7. The storage device of claim 6, wherein the storage controller is configured to generate the failure signal indicating that the first operation request cannot be processed based on the first logical block address by the processor, wherein the processor is configured to generate the failure signal indicating that the first operation request cannot be processed further based on results of the first comparison operation and the second comparison operation.

8. The storage device of claim 7, wherein
the storage controller is configured to receive a sync command generated based on the failure signal, read the first preliminary data stored in the second memory address, and write the first preliminary data to a position corresponding to the current write pointer of the target zone.

9. The storage device of claim 1, wherein
the second memory comprises a single-level cell (SLC) region, and the first memory comprises a triple-level cell (TLC) region.

10. A storage system, comprising:
a host device configured to send a plurality of operation requests, each of the plurality of operation requests including a logical block address, a write command, and write data; and
a storage device including:
    a first memory including a plurality of zones configured to sequentially store data, and
    a second memory configured to:
        store preliminary data to be written in the plurality of zones,
        store first write data corresponding to a first operation request in the second memory as first preliminary data based on a determination that the first operation request among the plurality of operation requests cannot be processed, and write, in response to receiving a sync command from the host device, the first preliminary data to a position corresponding to a write pointer, the write pointer indicating a position in the first memory to write the data, wherein the storage device is configured to generate a failure signal indicating that the first operation request cannot be processed based on a first logical block address corresponding to the first operation request in response to the determination that the first operation request cannot be processed.

11. The storage system of claim 10, wherein
the host device is configured to send a set feature command to set a size of the second memory, and the storage device is configured to generate a reserved address mapping table comprising mapping information between the logical block address and a second memory address of the second memory based on the set feature command.

12. The storage system of claim 10, wherein
the host device is configured to, based on the failure signal, generate the sync command to instruct the storage device to read the preliminary data stored in the second memory and store the preliminary data in the first memory.

13. The storage system of claim 10, wherein
the storage device is configured to determine, based on the logical block address, a target zone to write among the plurality of zones and a target write pointer indicating a position to write in the target zone.

14. The storage system of claim 13, wherein
the storage device is configured to determine that the first operation request cannot be processed based on a first position of the target write pointer corresponding to the first operation request and a second position of a current write pointer of the target zone being different.

15. The storage system of claim 14, wherein
the sync command comprises a first logical block address, and the storage device is configured to read the first preliminary data in response to receiving the sync command and write the first preliminary data to a position corresponding to the current write pointer of the target zone.

16. The storage system of claim 13, wherein
the storage device is configured to determine that the first operation request cannot be processed based on a first size of the first write data being greater than a second size of a remaining storage space of the target zone.

17. The storage system of claim 16, wherein
the sync command comprises a second logical block address that is different from a first logical block address, and the storage device is configured to read the first preliminary data in response to receiving the sync command and write the first preliminary data to a position corresponding to a current write pointer of the target zone corresponding to the second logical block address.

18. An operating method of a storage system, comprising:

receiving an operation request for writing write data to a position corresponding to a first logical block address in a plurality of zones, the plurality of zones configured to sequentially store data based on a write pointer indicating a position to write the data;

determining, based on the first logical block address, i) a target zone to write among the plurality of zones and ii) a target write pointer indicating a position to write in the target zone, and determining whether to process the operation request based on a position of a current write pointer of the target zone and the position of the target write pointer;

determining that the operation request cannot be processed, storing the write data as preliminary data in a second memory based on determining that the operation request cannot be processed;

generating a failure signal indicating that the operation request cannot be processed based on the first logical block address corresponding to the operation request in response to determining that the operation request cannot be processed;

receiving a sync command including the first logical block address; and reading the preliminary data and writing the preliminary data to the position corresponding to the current write pointer of the target zone.

19. The operating method of the storage system of claim 18, wherein the determining of whether to process the operation request comprises determining that the operation request cannot be processed based on determining that a first size of the write data is greater than a second size of a remaining storage space of the corresponding target zone among the plurality of zones, wherein the operating method comprises receiving a sync command including a second logical block address that is different from the first logical block address, and wherein the writing of the preliminary data comprises writing the preliminary data to a position corresponding to the position of the current write pointer of the target zone corresponding to the second logical block address.

* * * * *